(12) United States Patent
Weflen

(10) Patent No.: US 9,809,183 B2
(45) Date of Patent: Nov. 7, 2017

(54) SELF-CONTAINED AUTOMOTIVE BATTERY BOOSTER SYSTEM

(71) Applicant: Darryl Weflen, Edmonton (CA)

(72) Inventor: Darryl Weflen, Edmonton (CA)

(*) Notice: Subject to any disclaimer, the term of this patent is extended or adjusted under 35 U.S.C. 154(b) by 56 days.

(21) Appl. No.: 14/034,202

(22) Filed: Sep. 23, 2013

(65) Prior Publication Data

US 2014/0084844 A1   Mar. 27, 2014

Related U.S. Application Data

(60) Provisional application No. 61/704,520, filed on Sep. 23, 2012.

(51) Int. Cl.
*B60R 16/033* (2006.01)

(52) U.S. Cl.
CPC ................... *B60R 16/033* (2013.01)

(58) Field of Classification Search
CPC .................................................... B60R 16/033
USPC .......................................................... 320/104
See application file for complete search history.

(56) References Cited

U.S. PATENT DOCUMENTS

| | | | | |
|---|---|---|---|---|
| 3,105,910 A * | 10/1963 | Chambers | ........... | F02N 11/0866 307/10.1 |
| 4,079,304 A * | 3/1978 | Brandenburg | ......... | H02G 11/02 191/12.4 |
| 5,083,076 A * | 1/1992 | Scott | ................... | H01M 10/46 320/105 |
| 5,194,799 A * | 3/1993 | Tomantschger | .. | H01M 10/4207 320/103 |
| 5,497,066 A * | 3/1996 | Drouillard | ............ | H02J 7/0073 320/117 |
| 5,710,506 A * | 1/1998 | Broell | .................... | H02J 7/0073 320/145 |
| 5,796,255 A * | 8/1998 | McGowan | ............ | H02J 7/0034 324/429 |
| 6,788,025 B2 * | 9/2004 | Bertness | ................ | H02J 7/0054 320/104 |

(Continued)

*Primary Examiner* — Yalkew Fantu
*Assistant Examiner* — Dung V Bui
(74) *Attorney, Agent, or Firm* — J. Jay Haugen; Dentons Canada LLP

(57) ABSTRACT

A self-contained automotive battery booster system for boosting depleted automotive batteries when no external power source is available is provided, the self-contained automotive battery booster system having an integral power source; means for connecting the self-contained automotive battery booster system to an automotive battery; circuitry to ensure the safety of the user, the self-contained automotive battery booster system and the depleted automotive battery; and circuitry to allow the user to control the flow of electricity from the integral power source to the depleted automotive battery. The circuitry to ensure the safety of the user, the self-contained automotive battery booster system and the depleted automotive battery can include various warning indicators such as horns and LEDs and can prevent the activation of the self-contained automotive battery booster system in certain situations. The circuitry to allow the user to control the flow of electricity from the integral power source to the depleted automotive battery can allow the user to select different output voltages depending on the voltage required by the depleted battery.

19 Claims, 3 Drawing Sheets

(56) References Cited

U.S. PATENT DOCUMENTS

| 7,345,450 B2* | 3/2008 | Krieger | H02J 7/0034 |
| | | | 320/104 |
| 2014/0084844 A1* | 3/2014 | Weflen | B60R 16/033 |
| | | | 320/104 |

* cited by examiner

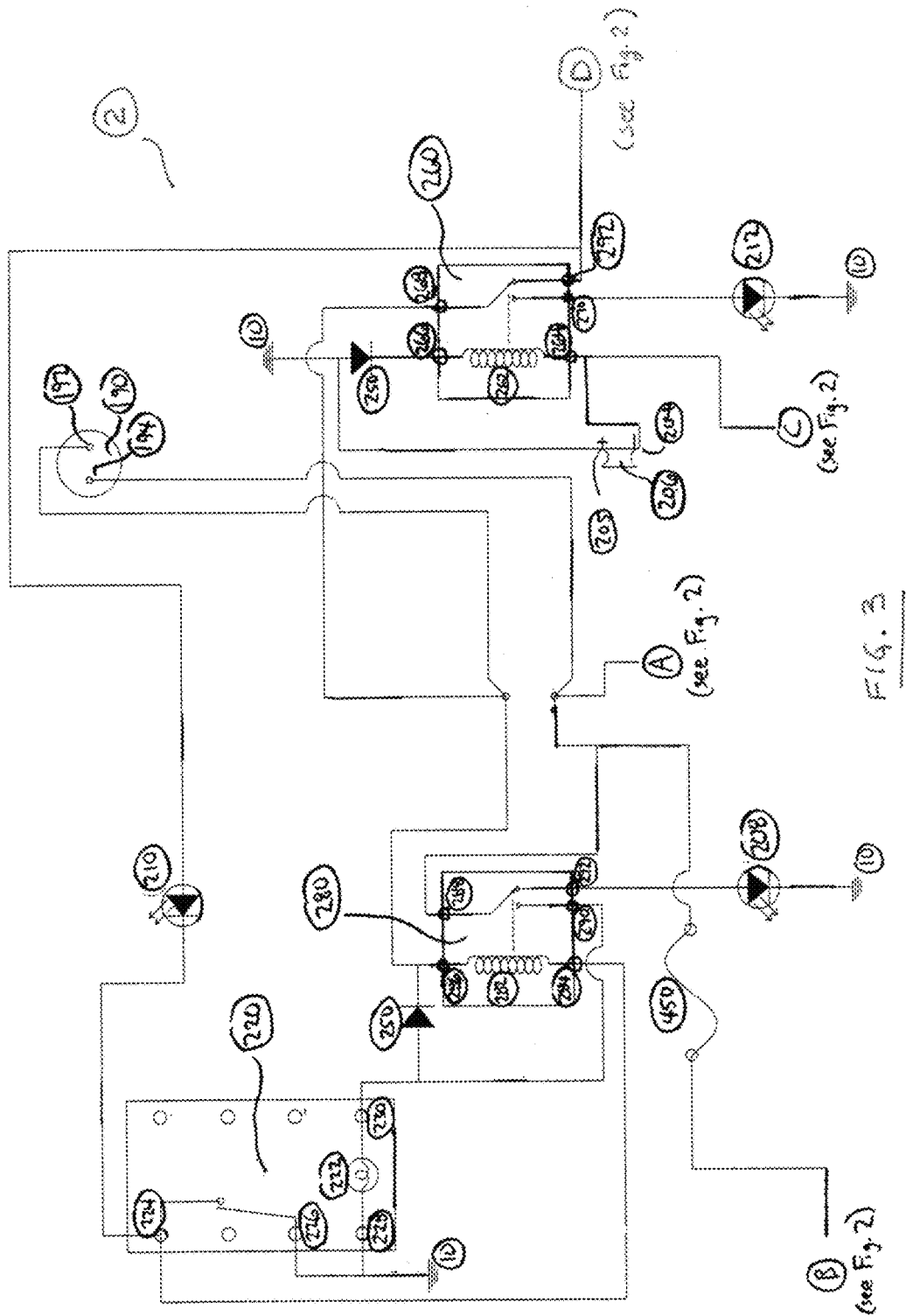

SELF-CONTAINED AUTOMOTIVE BATTERY BOOSTER SYSTEM

RELATED APPLICATIONS

This application claims priority from U.S. provisional patent application No. 61/704,520 filed Sep. 23, 2012 and which is hereby incorporated by reference in its entirety.

TECHNICAL FIELD

The present disclosure is related to the field of automotive battery booster systems, in particular, automotive battery booster systems that allow for the safe boosting of automotive batteries using an internal direct current source.

BACKGROUND

It is known to use various means to boost depleted automotive batteries to a point where the vehicle containing the depleted battery can be started. The most common external sources used for this purpose are the batteries of operating vehicles and purpose-built charging systems. Each of these means of boosting a depleted automotive battery has significant limitations.

Boosting a depleted automotive battery by connecting the battery of an operating vehicle to the battery to be boosted can be a dangerous process. If the cables used to connect the depleted battery to the operational battery are connected incorrectly, sparks may be produced at the connection points and one or both of the batteries may even explode. However, the most obvious problem with using an operational vehicle to boost a depleted automotive battery is that in many situations where a depleted automotive battery requires boosting, an operational vehicle to provide the boost is not readily available. Complicating matters further is that the output voltage of the depleted battery and the output voltage of the operational battery must be the same in order for this method of boosting to work.

Various types of purpose-built charging systems may be used to charge or boost a depleted automotive battery. These charging systems can also produce sparks and explosions of the depleted battery if connected incorrectly. The voltage output of the charging system must be compatible with the voltage output of the depleted battery. Finally, these charging systems typically require a connection to an external power outlet in order to operate.

It is therefore desirable to provide a self-contained automotive battery booster system that overcomes the shortcomings of the prior art.

SUMMARY

A self-contained automotive battery booster system is provided. In some embodiments, the booster system includes an internal power supply to supply electricity for boosting a depleted automotive battery, a positive polarity cable to connect to the positive terminal of the depleted battery and a negative polarity cable to connect to the negative terminal of the depleted battery.

Broadly stated, in some embodiments of the invention, the internal power supply further includes two 12-volt batteries, with circuitry to allow the user to switch the output voltage of the booster system between 12 volts and 24 volts in order to match the output voltages of different automotive batteries.

Broadly stated, in some embodiments, the booster system includes means for connecting the battery of an operating vehicle to the booster system in order to recharge the two 12-volt batteries.

Broadly stated, in some embodiments, the booster system includes a connector for connecting the battery of an operating vehicle to the booster system in order to recharge the two 12-volt batteries.

Broadly stated, in some embodiments, the booster system includes a switch to allow the user to activate the booster system once it has been properly connected.

Broadly stated, in some embodiments, the switch includes a timer system that activates the battery charger for only a fixed period of time when the switch is activated in order to prevent the overcharging of the depleted battery and the accidental activation of the booster system. If the user wishes to boost the depleted battery after the fixed period of time expires, the switch is reactivated to restart the timer.

Broadly stated, in some embodiments, the booster system includes a connection indicator LED that indicates when the booster system is connected to a depleted battery and the switch is engaged by the user.

Broadly stated, in some embodiments, the booster system includes a polarity-sensing circuit that prevents the booster system from activating if the booster system cables are connected to the wrong terminals of the depleted battery.

Broadly stated, in some embodiments, the polarity-sensing circuit further includes an alert indicator LED, an alert horn and a boosting indicator LED. The alert indicator LED and the alert horn are triggered to alert the user when the booster system cables are connected to the wrong terminals of the depleted battery. The boosting indicator LED indicates when the booster system cables are connected properly and the depleted battery can be boosted by the booster system.

Broadly stated, in some embodiments, the booster system further includes a voltmeter that can display the output voltage of the internal power supply.

BRIEF DESCRIPTION OF THE DRAWINGS

FIG. 3 is a schematic diagram showing the self-contained automotive battery booster system of FIG. 1. The connection points between the schematics shown in FIGS. 2 and 3 are marked with letters A, B, C and D.

DETAILED DESCRIPTION OF EMBODIMENTS

A self-contained automotive battery booster system is provided. In particular, a self-contained automotive battery booster system is provided that is powered by batteries and contains several safety systems to prevent misuse by users. The self-contained automotive battery booster system can be used where external power sources and operating vehicles are not available.

Figure 1:
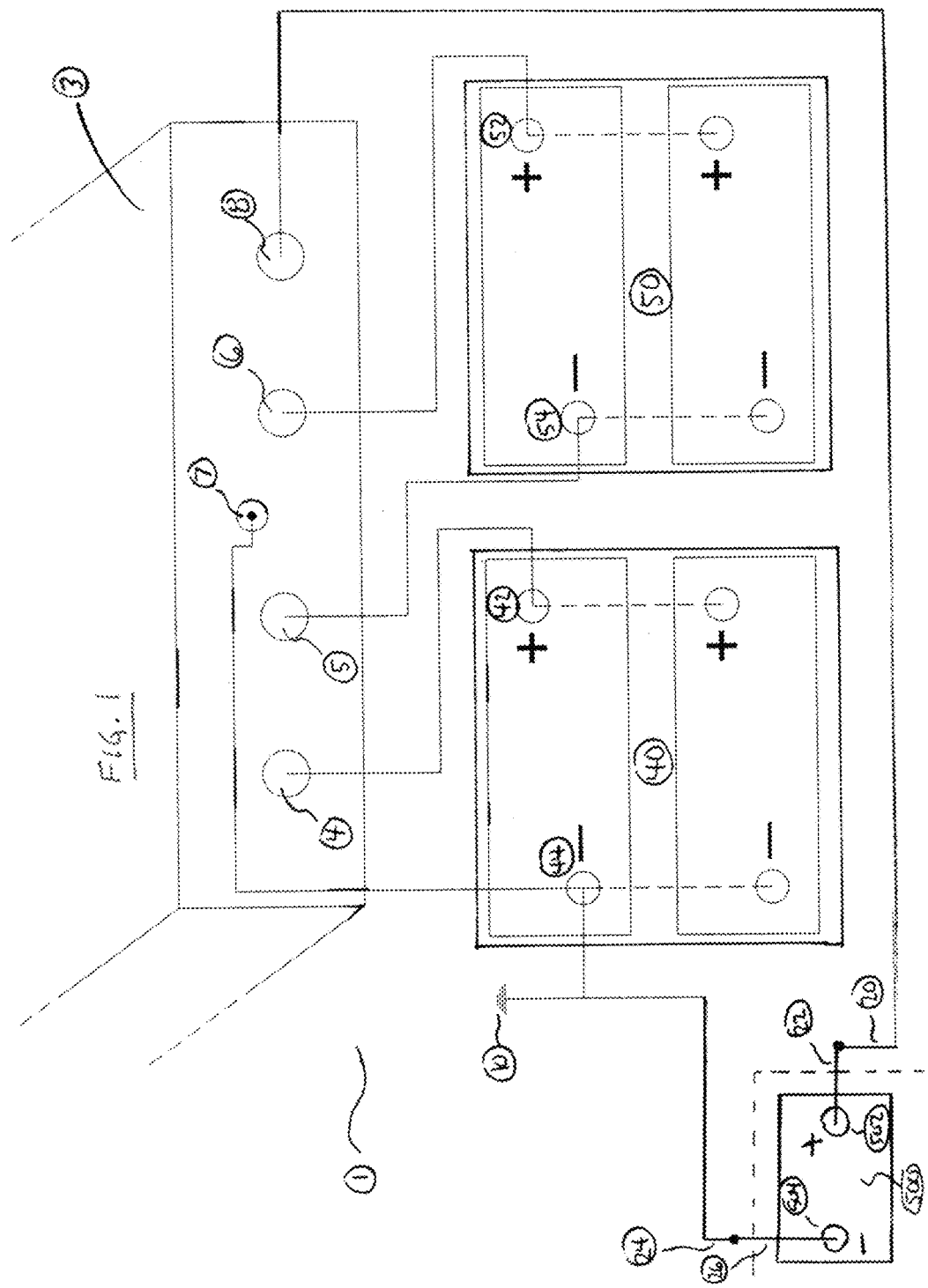
FIG. 1 is a block diagram depicting an embodiment of a self-contained automotive battery booster system connected to a depleted battery.
Figure 2:
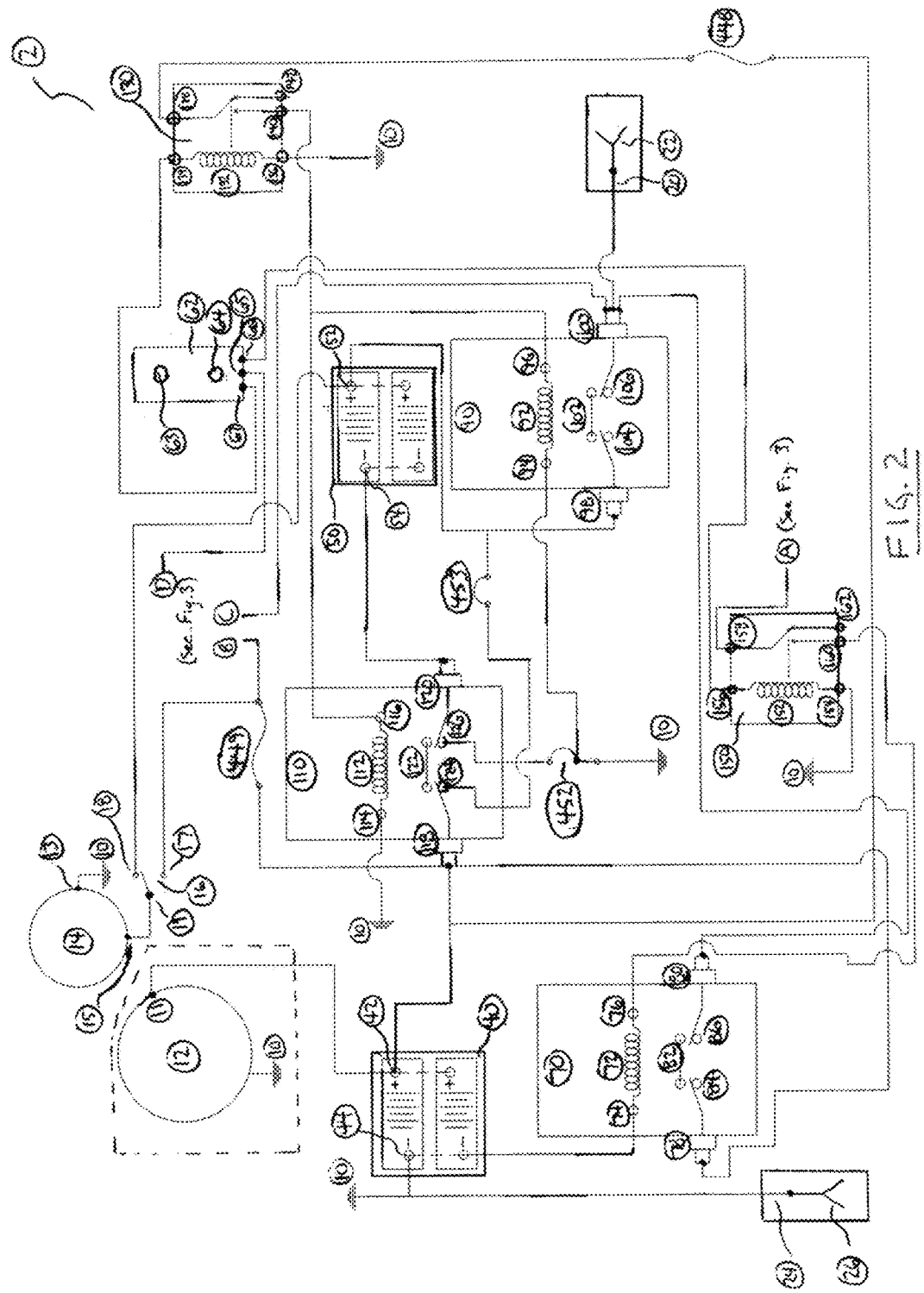
FIG. 2 is a schematic diagram showing the self-contained automotive battery booster system of FIG. 1. The connection points between the schematics shown in FIGS. 2 and 3 are indicated with the letters A, B, C and D.

Referring to FIGS. 1 through 3, one embodiment of a self-contained automotive battery booster system is shown. The self-contained automotive battery booster system (1) includes self-contained automotive battery booster system circuitry (2) contained within self-contained automotive battery booster system case (3), positive booster cable (20), negative booster cable (24), a first supply battery (designated as "battery A" herein) (40), supply battery A positive terminal cable (43), supply battery A negative terminal cable (45), a second supply battery (designated as "battery B" herein) (50), supply battery B positive terminal cable (53), and supply battery B negative terminal cable (55).

Self-contained automotive battery booster system case (3) includes: input A positive (4) for connecting supply battery A positive terminal (42) of supply battery A (40) via supply battery A positive terminal cable (43); and input B negative (5) for connecting supply battery B negative terminal (54) of supply battery B (50) via supply battery B negative terminal cable (55). Input B positive (6) is for connection to supply battery B positive terminal (52) of supply battery B (50) via supply battery B positive terminal cable (53). Chassis ground connection (7) is for connection to supply battery A negative terminal (44) via supply battery A negative terminal cable (45).

Output (8) is for connection to positive booster cable (20) which is also connectable to depleted battery positive terminal (502) using positive booster clamp (22)

Supply battery A negative terminal (44) of supply battery A (40) can be connected to chassis ground (10) via wire (400). Negative booster cable (24) can connect supply battery A negative terminal (44) and, therefore, chassis ground (10), to depleted battery negative terminal (504) of depleted battery (500) using negative booster clamp (26).

Both supply battery A (40) and supply battery B (50) can be 12 volt automotive batteries, although batteries of other voltages can be substituted or added.

Self-contained automotive battery booster system circuitry (2) includes charging voltage selector switch (62), first double pole single throw switch (70), second double pole single throw switch (90), third double pole single throw switch (110), first single pole single throw relay (130), second single pole single throw relay (150), arming switch (190), horn (206), green LED (208), blue LED (210), red LED (212), timer (220), diodes (250), third single pole single throw relay (260), fourth single pole single throw relay (280), wires (400), fuses (449) and (450), circuit breaker (452) and circuit breaker (453).

Charging voltage selector switch (62) includes first normally-open push button switch (63), second normally-open push button switch (64), common input terminal (65), first switch output (66) and second switch output (67). When neither first normally-open push button switch (63) nor second normally-open push button switch (64) are actuated, common input terminal (65) is not connected to first switch output (66) or second switch output (67). When first normally-open push button switch (63) is pressed, common input terminal (65) is connected to first switch output (66). When second normally-open push button switch (64) is pressed, common input terminal (65) is connected to second switch output (67).

First double pole single throw switch (70) includes magnetic coil (72), terminals (74), (76), (78), (80), (84) and (86), and conductor (82). Magnetic coil (72) is connected to terminal (74) and terminal (76) such that when current flows between terminal (74) and terminal (76), magnetic coil (72) is energized. When magnetic coil (72) is energized, terminal (78) and terminal (80) are connected to one another via conductor (82). When magnetic coil (72) is not energized, terminal (78) is connected to terminal (84) and terminal (80) is connected to terminal (86).

Second double pole single throw switch (90) includes magnetic coil (92), terminals (94), (96), (98), (100), (104) and (106) and conductor (102). Magnetic coil (92) is connected to terminal (94) and terminal (96) such that when current flows between terminal (94) and terminal (96), magnetic coil (92) is energized. When magnetic coil (92) is energized, terminal (98) and terminal (100) are connected to one another via conductor (102). When magnetic coil (92) is not energized, terminal (98) is connected to terminal (104) and terminal (100) is connected to terminal (106).

Third double pole single throw switch (110) includes magnetic coil (112), and terminals (114), (116), (118), (120), (124) and (126), and conductor (122). Magnetic coil (112) is connected to terminal (114) and terminal (116) such that when current flows between terminal (114) and terminal (116), magnetic coil (112) is energized. When magnetic coil (112) is energized, terminal (118) and terminal (120) are connected to one another via conductor (122). When magnetic coil (112) is not energized, terminal (118) is connected to terminal (124) and terminal (120) is connected to terminal (126).

First single pole single throw relay (130) includes magnetic coil (132), and terminals (134), (136), (138), (140) and (142). Magnetic coil (132) is connected to terminal (134) and terminal (136) such that when current flows between terminal (134) and terminal (136), magnetic coil (132) is energized. When magnetic coil (132) is energized, terminal (138) is connected to terminal (140). When magnetic coil (132) is not energized, terminal (138) is connected to terminal (142).

Second single pole single throw relay (150) includes magnetic coil (152), and terminals (154), (156), (158), (160) and (162). Magnetic coil (152) is connected to terminal (154) and terminal 86 (156) such that when current flows between terminal (154) and terminal (156), magnetic coil (152) is energized. When magnetic coil (152) is energized, terminal (158) is connected to terminal (160). When magnetic coil (152) is not energized, terminal (158) is connected to terminal (162).

Third single pole single throw relay (260) includes magnetic coil (262), and terminals (264), (266), (268), (270) and (272). Magnetic coil (262) is connected to terminal (264) and terminal (266) such that when current flows between terminal (264) and terminal (266), magnetic coil (262) is energized. When magnetic coil (262) is energized, terminal (268) is connected to terminal (270). When magnetic coil (262) is not energized, terminal (268) is connected to terminal (272).

Fourth single pole single throw relay (280) includes magnetic coil (282), and terminals (284), (286), (288), (290) and (292). Magnetic coil (282) is connected to terminal (284) and terminal (286) such that when current flows between terminal (284) and terminal (286), magnetic coil (282) is energized. When magnetic coil (282) is energized, terminal (288) is connected to terminal (290). When magnetic coil (282) is not energized, terminal (288) is connected to terminal (292).

Arming switch (190) includes inputs (192) and (194). Arming switch (190) may be a normally-open push button switch. When arming switch (190) is depressed, input (192) and input (194) are connected. When arming switch (190) is not depressed, input (192) and input (194) are not connected.

Timer (220) includes an Omron H3YN solid-state timer, although other functionally equivalent timers as known to those skilled in the art can be substituted in other embodiments. Timer (220) includes timer circuit (222), and timer inputs (224), (226), (228) and (230). In the default state of timer (220), timer input (224) is connected to timer input (226). Timer circuit (222) is connected between timer input 228) and timer input (230) such that when current flows from timer input (230) through timer circuit (222) to timer input (228), timer circuit (222) begins counting down for a fixed period of time. When the fixed period of time expires, the connection between timer input (224) and timer input (226) is broken briefly. Timer (220) can then return to its default state.

Supply battery A negative terminal (44) is connected to negative booster cable (24), and terminal (74) of first double pole single throw switch (70), terminal (114) of third double pole single throw switch (110), terminal (126) of third double pole single throw switch (110) via circuit breaker (452), terminal (94) of second double pole single throw switch (90), terminal (136) of first single pole single throw relay (130), terminal (154) of second single pole single throw relay (150), terminal (86) of first single pole single throw relay (130), timer input (226) and timer input (228) of timer (220), terminal (292) of fourth single pole single throw relay (280) and terminal (270) of third single pole single throw relay (260), and chassis ground (10).

Supply battery A positive terminal (42) is connected to: terminal (118) of third double pole single throw switch (110); terminal (158) of second single pole single throw relay (150), terminal (288) of fourth single pole single throw relay (280), and arming switch input (194) via fuse (449) and fuse (450); terminal (78) of first double pole single throw switch (70); and terminal (138) of first single pole single throw relay (130) via fuse (448).

Supply battery B negative terminal (54) is connected to terminal (120) of third double pole single throw switch (110), and supply battery B positive terminal (52) is connected to terminal (98) of second double pole single throw switch (90) and terminal (124) of third double pole single throw switch (110) via circuit breaker (453).

First single pole single throw relay (130) controls the operation of second double pole single throw switch (90) and third double pole single throw switch (110) by connecting terminal (140) of relay (130) to terminal (96) of second double pole single throw switch (90) and terminal (116) of third double pole single throw switch (110). First single pole single throw relay (130) is in turn be controlled by second normally-open push button switch (64) of charging voltage selector switch (62) by a connection between switch output (67) of charging voltage selector switch (62) and terminal (134) of first single pole single throw relay (130). In some embodiments, terminal (142) of first single pole single throw relay (130), terminal (104) of second double pole single throw switch (90) and terminal (106) of second double pole single throw switch (90) can be left unconnected.

Second single throw single pole relay (150) controls the operation of first double pole single throw switch (70) by connecting terminal (160) of second single throw single pole relay (150) to terminal (76) of first double pole single throw switch (70). Second single pole single throw relay (150) is in turn controlled by first normally-open push button switch (63) of charging voltage selector switch (62) by a connection between switch output (66) of charging voltage selector switch (62) and terminal (156) of second single pole single throw relay (150). In some embodiments, terminal (162) of second single pole single throw relay (150), terminal (84) of first double pole single throw switch (70) and terminal (86) of first double pole single throw switch (70) can be left unconnected.

Arming switch (190), fourth single pole single throw relay (280) and timer (220) control the flow of current to common input terminal (65) of voltage selector switch (62), through terminal (268) and terminal (292) of third single pole single throw relay (260). When activated, arming switch (190) connects arming switch input (194) to arming switch input (192). Arming switch input (192) connects to terminal (268) of third single pole single throw relay (260) and terminal (286) of fourth single pole single throw relay (280). Terminal (292) of fourth single pole single throw relay (280) connects to chassis ground (10) via green LED (208), with green LED (208) oriented such that it activates when current flows from terminal (292) of fourth single pole single throw relay (280) to chassis ground (10). Terminal (290) of fourth single pole single throw relay (280) connects to timer input (230) of timer (220) and to terminal (286) of fourth single pole single throw relay (280) via diode (250), with diode (250) oriented such that current can only flow from terminal (290) of fourth single pole single throw relay (280) to terminal (286) of single pole single throw relay (280). Terminal (284) of fourth single pole single throw relay (280) is connected to timer input (224) of timer (220). Timer input (226) and timer input (228) are connected to chassis ground.

Third single pole single throw relay (260) can prevent self-contained automotive battery booster system (1) from being activated when the polarity of positive booster cable (20) and negative booster cable (24) are reversed by the user attaching positive booster cable (20) to depleted battery negative terminal (504) of depleted battery (500) and attaching negative booster cable (24) to depleted battery positive terminal (502) of depleted battery (500). In this situation, chassis ground (10) is replaced by positive terminal (502) of depleted battery (500), which delivers a small amount of current, and positive booster cable (20) is replaced by chassis ground (10). Positive booster cable (20) is connected to terminal (264) of third single pole single throw relay (260) and to horn terminal (204) of horn (206). Second horn terminal (205) of horn (206) is connected to chassis ground (10) and terminal (266) of third single pole single throw relay (260) via diode (250). Diode (250) is oriented such that current can flow into but not out of terminal (266) of third single pole single throw relay (260). Thus, third single pole single throw relay (260) controls the flow of electricity to charging voltage selector switch (62) by connecting common input terminal (65) of charging voltage selector switch (62) to terminal (292) of third single pole single throw relay (260). Similarly, third single pole single throw relay (260) controls the flow of electricity to timer input (224) of timer (220) by connecting terminal (292) of third single pole single throw relay (260) to timer input (224) of timer (220).

Blue LED (210) is connected between connecting terminal (292) of third single pole single throw relay (260) and timer input (224) of timer (220) and oriented such that blue LED (210) is activated when current flows from terminal (292) of third single pole single throw relay (260) to timer input (224) of timer (220). Red LED (212) is connected in between terminal (270) of third single pole single throw relay (260) and chassis ground (10) and oriented such that red LED (212) is activated when current flows from terminal (270) of single pole single throw relay (260) to chassis ground (10). Therefore, third single pole single throw relay (260) can only connect terminal (268) of third single pole single throw relay (260) to terminal (270) of third single pole single throw relay (260) when the user mistakenly reverses the polarity of positive booster cable (20) and negative booster cable (24) by connecting them to depleted battery negative terminal (504) and depleted battery positive terminal (502) of depleted battery (500), respectively. In such a case, horn (206) will sound and red LED (212) activates. If the user connects positive booster cable (20) and negative booster cable (24) correctly by connecting positive booster cable (20) and negative booster cable (24) to depleted battery positive terminal (502) and depleted battery (504) of depleted battery (500), respectively, chassis ground (10) functions normally, meaning terminal (268) of third single pole single throw relay (260) is connected to terminal (292) of third single pole single throw relay (260).

When depleted battery positive terminal (502) of depleted battery (500) is connected to positive booster cable (20) and depleted battery negative terminal (504) of depleted battery (500) is connected to negative booster cable (24), green LED (208) activates to indicate that self-contained automotive battery booster system (1) can deliver a surge of current to depleted battery (500) via self-contained automotive battery booster system circuitry (2). In order to deliver this charge, arming switch (190) is engaged to initiate current flow to magnetic coil (282) of fourth single pole single throw relay (280) and common input (65) of voltage selector switch (62), blue LED (210) and timer input (224) of timer (220) via third single pole single throw relay (260). This current flow activates blue LED (210) and causes terminal (288) of fourth single pole single throw relay (280) to connect to terminal (290) of fourth single pole single throw relay (280), which in turn activates timer circuit (222) of timer (220). Timer (220) then begins counting down for a fixed period of time. Magnetic coil (282) of fourth single pole single throw relay (280), common input (65) of voltage selector switch (62), blue LED (210) and timer input (224) of timer (220), continue to receive current from terminal (290) of fourth single pole single throw relay 4 (280) via diode (250) after arming switch (190) is disengaged. Terminal (290) of fourth single pole single throw relay (280) can continue to supply current via diode (250) as long as timer (220) is counting down. When timer (220) finishes counting down, timer circuit (222) momentarily breaks the connection between timer input (224) and timer input (226), ending the supply of current to magnetic coil (282) of fourth single pole single throw relay (280), common input (65) of voltage selector switch (62), blue LED (210) and timer input (224). In order to re-establish current flow to magnetic coil (282) of fourth single pole single throw relay (280), common input (65) of voltage selector switch (62), blue LED (210) and timer input (224), arming switch (190) must be reactivated to restart timer (220).

When current is flowing to common input (65) of voltage selector switch (62), the user can activate either first normally-open push button switch (63) or second normally-open push button switch (64) to allow self-contained automotive battery booster system (1) to deliver a surge of current to depleted battery (500). Activating first normally-open push button switch (63) triggers second single pole single throw relay (150), that, in turn, triggers first double pole single throw switch (70), connecting terminal (78) of first double pole single throw switch (70) to terminal (80) of first double pole single throw switch (70), delivering a boosting current at the voltage equal to that of supply battery A (40) to depleted battery positive terminal (502) of depleted battery (500) via positive booster cable (20). Activating second normally-open push button switch (64) triggers first single pole single throw relay (130), that, in turn, triggers second double pole single throw switch (90), connecting terminal (98) of second double pole single throw switch (90) to terminal (100) of second double pole single throw switch (90), and third double pole single throw switch (110), and connecting terminal (118) of third double pole single throw switch (110) to terminal (120) of third double pole single throw switch (110), delivering a boosting current at a voltage equal to that of the combined voltages of supply battery A (40) and supply battery B (50) to depleted battery positive terminal (502) of depleted battery (500) via positive booster cable (20).

Supply battery A (40) and supply battery B (50) may be 12 volt automotive batteries and, in such a case, self-contained automotive battery booster system (1) can be used to charge 12 volt and 24 volt automotive batteries. Batteries of different voltages could be used.

Self-contained automotive battery booster system (1) may include voltmeter (14) and voltmeter selector switch (16). Voltmeter (14) has voltmeter inputs (13) and (15) and voltmeter selector switch (16), which in turn includes first voltmeter selector switch input (17), second voltmeter selector switch input (18) and voltmeter selector switch output (19). By connecting voltmeter input (13) to chassis ground (10), voltmeter input (15) to voltmeter selector switch output (19), second voltmeter selector switch input (18) to supply battery B positive terminal (52) and first voltmeter selector switch input (17) to supply battery A positive terminal (42), voltmeter selector switch (16) can test the output voltage of supply battery A (40) and supply battery B (50). When voltmeter selector switch output (19) is connected to voltmeter selector switch input (17), voltmeter (14) can display output voltage of supply battery A (40). When voltmeter selector switch output (19) is connected to voltmeter selector switch input (18), voltmeter (14) can display output voltage of supply battery B (50).

Charging vehicle alternator (12) can be used to recharge supply battery A (40) and supply battery B (50) by connecting charging vehicle alternator output (11) of charging vehicle alternator (12) to supply battery A positive terminal (42). When charging vehicle alternator (12) is operating, current can flow into supply battery A positive terminal (42) and into supply battery B positive terminal through terminal (118) of third double pole single throw switch (110), terminal (124) of third double pole single throw switch (110) and circuit breaker (453). During charging, supply battery B negative terminal (54) is connected to chassis ground (10) via terminal (120) of third double pole single throw switch (110), terminal (126) of third double pole single throw switch (110) and circuit breaker (452).

Many alternatives to the above system can be implemented without departing from the spirit of the invention. For example, rather than LED lights or horns, alternate electrically activated warnings could be displayed such as text displays or the like.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A self-contained automotive battery booster system for delivering electrical current to a depleted automotive battery, the booster system comprising:
   a) an integral power source, the integral power source configured to deliver the electrical current at one of two predetermined voltages, the system further comprising an electric switch configured to switch between the two predetermined voltages;

b) a connector configured to connect the integral power source to the depleted automotive battery;
c) a first circuit configured to control the flow of electricity from the integral power source to the depleted automotive battery;
d) a second circuit configured to provide an alert to a user, the second circuit comprising an arming switch and a timer, the arming switch further configured to activate the timer to further activate the first circuit to connect the integral power source to the depleted automotive battery for a fixed period of time when the arming switch is armed, wherein the fixed period of time is set by the timer; and
e) a status indicator configured to inform the user when the timer is activated, wherein the status indicator facilitates activation of the first circuit to control the flow of electricity from the integral power source to the depleted automotive battery such that a surge of electrical current is delivered from the integral power source to the depleted automotive battery.

2. The booster system as set forth in claim 1, wherein the integral power source comprises at least two batteries.

3. The booster system as set forth in claim 1, wherein the second circuit further comprises a third circuit configured to warn the user when the user has incorrectly connected the booster system to the depleted automotive battery.

4. The booster system as set forth in claim 1, wherein the second circuit further comprises a fourth circuit configured to prevent the user from engaging the flow of electricity from the integral power source to the depleted automotive battery when the user has incorrectly connected the booster system to the depleted automotive battery.

5. The booster system as set forth in claim 1 wherein the second circuit further comprises one or both of a horn and a warning LED.

6. The booster system as set forth in claim 1, wherein the second circuit further comprises a connection indicator LED to inform the user when the booster system is properly connected to the depleted automotive battery.

7. The booster system as set forth in claim 2, wherein the first circuit is further configured to deliver electrical current to the depleted battery at a voltage equal to one of the at least two batteries.

8. The booster system as set forth in claim 2, wherein the first circuit is further configured to deliver electrical current to the depleted battery at a voltage equal to the at least two batteries connected in series.

9. The booster system as set forth in claim 2, wherein the booster system further comprises charging circuitry configured for charging the at least two batteries by an alternator disposed in an operating motor vehicle.

10. The booster system as set forth claim 6, wherein the booster system further comprises a voltmeter configured to show the output voltage of the integral power source.

11. A self-contained automotive battery booster system for delivering electrical current to a depleted automotive battery, the booster system comprising:
a) an integral power source, the integral power source configured to deliver the electrical current at one of two predetermined voltages, the system further comprising an electric switch configured to switch between the two predetermined voltages;
b) means for connecting the integral power source to the depleted automotive battery;
c) a first circuit means for controlling the flow of electricity from the integral power source to the depleted automotive battery;
d) a second circuit means for providing an alert to a user, the second circuit comprising an arming switch and a timer, the arming switch further configured to activate the timer to further activate the first circuit to connect the integral power source to the depleted automotive battery for a fixed period of time when the arming switch is armed, wherein the fixed period of time is set by the timer; and
e) a status indicator configured to inform the user when the timer is activated, wherein the status indicator facilitates activation of the first circuit to control the flow of electricity from the integral power source to the depleted automotive battery such that a surge of electrical current is delivered from the integral power source to the depleted automotive battery.

12. The booster system as set forth in claim 11, wherein the integral power source comprises at least two batteries.

13. The booster system as set forth in claim 11, wherein the second circuit means further comprises third circuit means for alerting the user when the user has incorrectly connected the booster system to the depleted automotive battery.

14. The booster system as set forth in claim 11, wherein the second circuit means further comprises a fourth circuit means for preventing the user from engaging the flow of electricity from the integral power source to the depleted automotive battery when the user has incorrectly connected the booster system to the depleted automotive battery.

15. The booster system as set forth in claim 11 wherein the second circuit means further comprises one or both of a horn and a warning LED.

16. The booster system as set forth in claim 11, wherein the second circuit means further comprises a connection indicator LED to inform the user when the booster system is properly connected to the depleted automotive battery.

17. The booster system as set forth in claim 12, wherein the first circuit means is further configured to deliver electrical current to the depleted battery at a voltage equal to one of the at least two batteries or at a voltage equal to the at least two batteries connected in series.

18. The booster system as set forth in claim 12, wherein the booster system further comprises charging circuitry configured for charging the at least two batteries by an alternator disposed in an operating motor vehicle.

19. The booster system as set forth in claim 11, further comprising a voltmeter configured to show the output voltage of the integral power source.

* * * * *